United States Patent

[11] 3,571,925

[72] Inventor Herbert F. Deutschmann
 1230 Queens Blvd., Kitchener, Ontario, Canada
[21] Appl. No. 763,752
[22] Filed Sept. 30, 1969
[45] Patented Mar. 23, 1971

[54] DEVICE FOR REMOVING THE SKIN FROM AN ORANGE OR THE LIKE
 1 Claim, 3 Drawing Figs.
[52] U.S. Cl. ............................................................. 30/24
[51] Int. Cl. ........................................................ A47j 17/04
[50] Field of Search ................................................ 30/24

[56] References Cited
 UNITED STATES PATENTS
 1,231,913 7/1917 Kosin .......................... 30/24
 1,644,119 10/1927 Fowler ........................ 30/24(UX)

*Primary Examiner*—Othell M. Simpson
*Attorney*—Fetherstonhaugh and Co.,

ABSTRACT: The invention relates to a device for removing the skin from an orange or the like. The device comprises a peeling blade which has a leading edge which is adapted to cut the skin of the orange and to separate the skin from the fruit by lifting the skin. At least one cutting edge extends upwardly from the peeling blade to cut through the thickness of the skin of the orange to cut the portion of the skin which has been separated from the fruit from the portion which remains attached to the fruit. A handle is connected to the blade for manual manipulation of the device.

PATENTED MAR 23 1971 3,571,925

INVENTOR.
HERBERT FREDERICK
DEUTSCHMANN

BY *Featherstonhaugh & Co.*

ATTORNEYS 3,571,925

DEVICE FOR REMOVING THE SKIN FROM AN ORANGE OR THE LIKE

FIELD OF THE INVENTION

This invention relates to a device for removing the skin from an orange or the like.

PRIOR ART

While devices have been produced for peeling oranges and the like the most common way of removing the skin from an orange is simply to cut through the thickness of the skin to provide a series or score lines, then to remove the skin by hand. Frequently for commercial purposes the skin is simply pared off by means of a knife, however, this generally results in too much or too little skin being removed. The problem with the conventional knife being that it simply cuts through the skin at the level at which the blade is located and it does not cleanly separate the skin from the fruit.

SUMMARY OF THE INVENTION

The present invention overcomes the difficulties of the prior art by providing a device for removing the skin from an orange which is adapted to lift the skin from the orange and to cut through the thickness of the skin to separate a portion of the skin which is removed from the fruit from the portion which remains attached to the fruit. According to the present invention a device for removing the skin from an orange or the like comprises a peeling blade having a leading edge adapted to separate the skin from the fruit of an orange or the like, at least one cutting edge extending upwardly from said peeling blade and adapted to cut through the thickness of the skin of the orange to cut the portion of the skin which has been separated from the fruit from the portion which remains attached to the fruit and handle means connected to said blade for manually manipulating said device.

Figure 1:
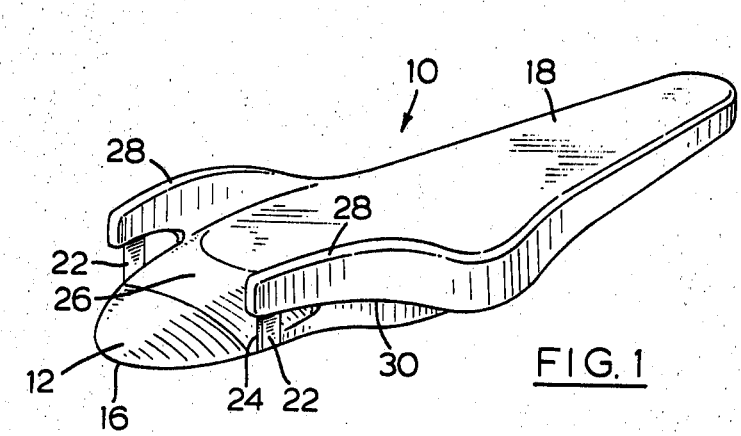
FIG. 1 is a pictorial top view of a device according to an embodiment of the present invention.

The reference numeral 10 refers generally to a device for removing the skin from an orange or the like according to an embodiment of the present invention. Fruit such as oranges, lemons, grapefruit and pomegranates have a relatively thick skin which must be removed before the fruit is eaten. Due to the thickness of the skin it can be removed by lifting it from the surface of the fruit whereas the skin of an apple or the like is generally so thin that it would break unless a portion of the fruit is removed with the skin.

Figure 2:
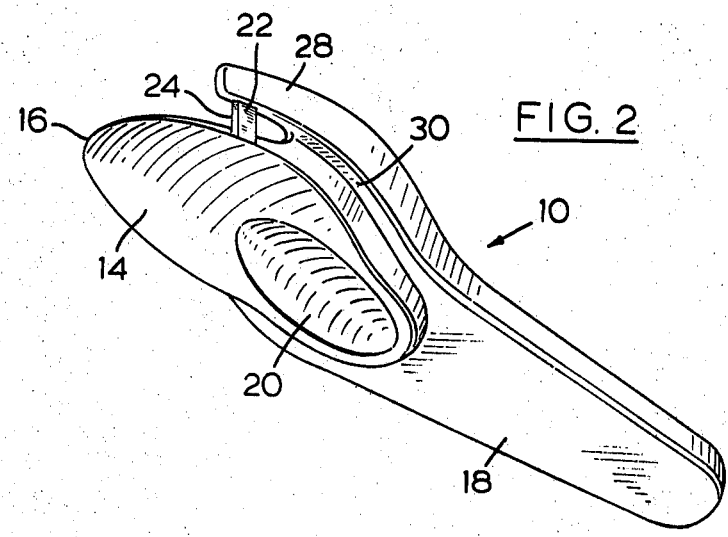
FIG. 2 is a pictorial view of the underside of the device illustrated in FIG. 1.
Figure 3:
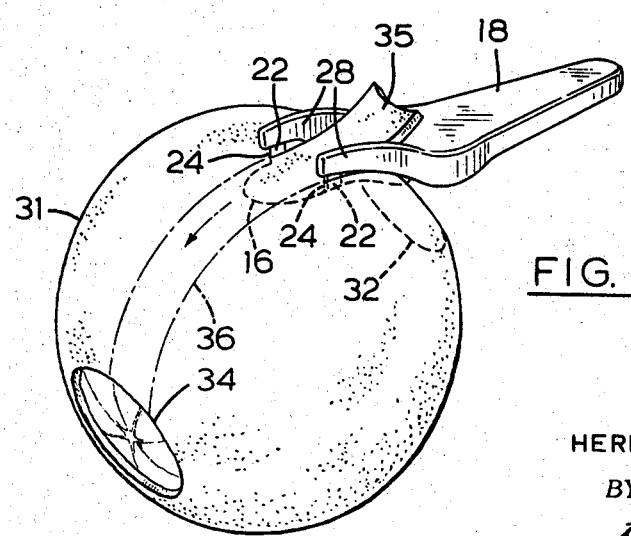
FIG. 3 is a pictorial view of the device in use.

The device 10 has a peeling blade 12 which is formed with a lower surface 14 which has a concave curvature substantially conforming to the curvature of the surface of the fruit. The blade 12 has a leading edge 16 preferably a rounded edge rather than a sharp knife edge so that it will tend to lift the skin from the fruit rather than to cut through the skin. When viewed from above and below as shown in FIGS. 1 and 3 the cutting edge 16 has a semicircular outline. Preferably although not essentially the blade 12 is made from a metal such as stainless steel or the like which will not be corroded by fruit juice. In the embodiment illustrated the blade 12 is molded integrally with a handle 18 which is preferably made from a plastic material and the blade 12 is held in position by the handle 18. As shown in FIG. 2 a portion 20 of the moulded handle extends over the rear end of the blade 12 to firmly secure the blade in position. The handle 18 is suitably formed for gripping purposes.

A pair or cutting edge members 22 extend upwardly from opposite sides of the blade 12 and are preferably formed integrally therewith. Each of the cutting edge members has a forward edge 24 which is adapted to cut substantially vertically through the thickness of the skin which is being removed. These cutting edge members serve to cut the portion of the skin which has been separated from the fruit from the portion which remains attached to the fruit such that the skin may be removed in sections.

The thickness of the blade 12 increases inwardly from the leading edge 16 thereof and the effective thickness is further increased by the addition of the wedge-shaped plastic overlay 26 which has a contour conforming substantially to the contour of the blade 12 and cooperates therewith to form a wedge-shaped lifting device which will tend to elevate the portions of the skin of the fruit which are passed over this surface thereby assisting the peeling process. It will be noted at the wedge-shaped portion 26 of the handle cooperates with the peeling blade and it is effective in improving the lifting effect of the blade as it passes under the skin.

The upper ends of the cutting edge members 24 are secured by arms 28 which are formed integrally with the handle portion 18. The arms 28 have an under surface or guide surface 30 which extends substantially parallel to the concave contour of the underside 14 of the blade 12. The guide surface 30 is spaced outwardly from the under surface 14 of the blade a distance which is at least equal to the greatest thickness of the skin which is to be removed. The guide surface assists the operator in gauging the depth of the peeling blade with respect to tee outer surface of the skin. The arms 28 diverge in a direction away from the cutting member 22 such that sufficient clearance will be provided to permit the portion of the skin which has been removed to pass rearwardly over the blade and between the arms 28.

When the device is in use removing the skin from an orange 31 as shown in FIG. 3, the first step is to remove a circular portion of the skin from opposite ends of the orange to provide a starting area 32 and a terminating area 34. These circular sections may be removed by puncturing the skin with the protruding end of the blade and rotating the device about the ends of the fruit to remove a circular disc of skin from either end. The device is then located as shown in FIG. 3 with the blade 12 positioned on the upper surface of the fruit such that it will pass under the skin and lift the portion of the skin shown in broken lines at 36 as it is moved from one end to the other. The skin which is lifted will pass between the cutting edge member 22 and over the thickness of the wedge-shaped blade.

Various modifications of the invention will be apparent to those skilled in the art without departing from the scope of this invention.

I claim:

1. A device for removing the skin from an orange or the like comprising:

a manually engageable handle;

a peeling blade mounted in said handle, said blade having an arcuated shaped leading edge projecting forwardly from one end of said handle;

a pair of cutter blades each having a forwardly directed generally vertical cutting edge, said blades being arranged one on either side of said peeling blade and projecting upwardly therefrom;

said peeling blade having an upper surface and a lower surface, said lower surface having a shallow concave curvature conforming generally to the curvature of the surface of an orange or the like;

the upper surface of the blade and adjacent portions of the handle are upwardly inclined relative to said lower surface in the direction away from the leading edge of the blade so as to lift the peeled portion of the skin away from the surface of the fruit as the blade is advanced;

said handle having a pair of arms arranged one on either side of said blade, said cutter blades having upper ends mounted in said arms, said arms projecting forwardly beyond said vertical cutting edges of said cutter blades to provide a safety shield therefor;

said arms having an undersurface spaced upwardly from and in substantially parallel relationship with respect to the lower surface of said blade; and said undersurface of said arms being spaced upwardly from the lower surface of said blade a distance at least equal to the thickness of the skin which is to be removed.